May 17, 1932.  R. E. JACOBS  1,858,506
ELECTRIC MACHINE
Filed Dec. 1, 1930
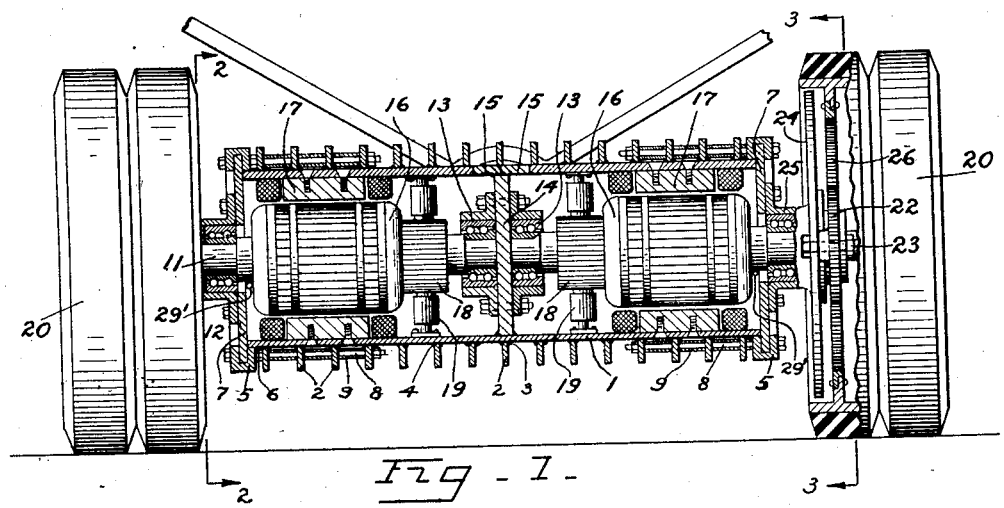
Fig-1-
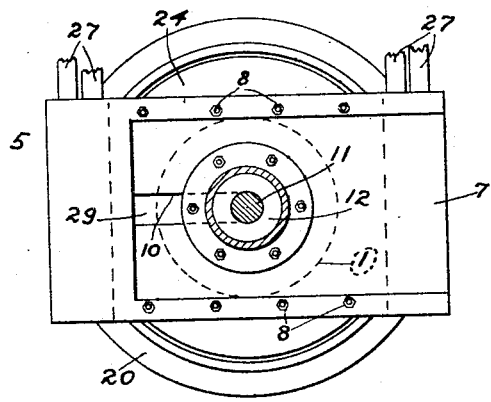
Fig-2-
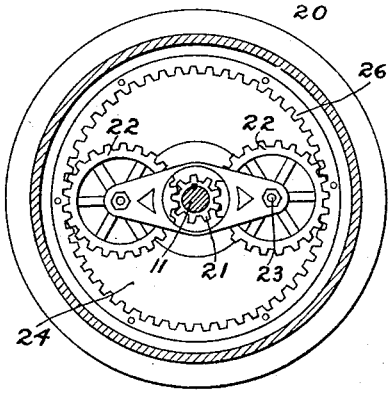
Fig-3-
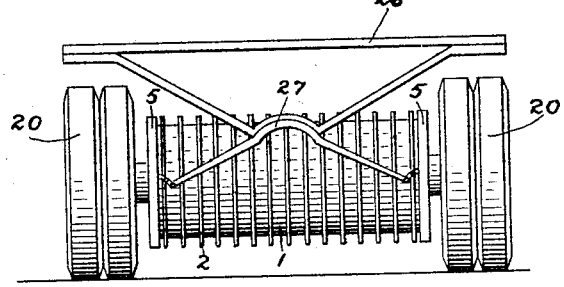
Fig-4-
INVENTOR.
REED ELLIOTT JACOBS.
BY Munn & Co.
ATTORNEYS.

Patented May 17, 1932

1,858,506

UNITED STATES PATENT OFFICE

REED E. JACOBS, OF OAKLAND, CALIFORNIA

ELECTRIC MACHINE

Application filed December 1, 1930. Serial No. 499,286.

My principal object is to provide a simple carriage of the two wheel variety, wherein great strength and rigidity is combined with lightness of weight, and which carriage is particularly designed to receive a car-body.

My invention is applicable to transportation carriages of every kind such as touring, commercial, Pullman sleepers, and freight train cars, and will differ only in relative dimensions for the various applications.

Among the salient objects of the invention are to provide fabricated cold-rolled steel welded together electric machine carriages containing the fewest possible parts necessary to effect a reduction in weight in conjunction with its incorporated sheet steel inter-pole motors.

Other objects are to embody this mechanism in such small dimensions of parts and compact form as to enable the same to be confined within a comparatively very small radius without materially increasing the dimensions of the same; to inclose all the working parts in dust and dirt-proof compartments in which the combination of armature, wheels and bearings with proper lubrication may function properly; to reduce wear and tear to a minimum and to eliminate the noise due to the many joints and loose parts, as in other constructions; and to provide a mechanism in which gear ratio and balance simplify the construction to some extent. Still other objects are to provide a mechanism having the form and character of a composite body welded together throughout; to provide a mechanism which permits the car being washed without danger of flooding the driving mechanism with water; to provide a transportation vehicle which can be manufactured economically, which will retain the original alignment of the parts to one another indefinitely, and which cannot be distorted in service by an uneven road-surface; and to provide a mechanism, making use of a single sheet steel tube containing two separate inter-pole motors separately controlling each wheel.

With these and other objects in view, the invention consists in the novel construction and arrangement of parts hereinafter described and more particularly pointed out in the claims. Practical forms in which my invention may be embodied are shown in the accompanying drawings, forming a part of the specification, in which Figure 1 is a longitudinal section through the device, portions being shown in elevation, Figure 2 is a section along the line 2—2 of Figure 1, Figure 3 is a section along the line 3—3 of Figure 1, and Figure 4 is a rear elevation.

In carrying out my invention I provide a tubular member 1 made of cold rolled steel, and I reinforce this tube by transverse plates 2 that have openings 3 for receiving the tube. Each transverse plate 2 is secured to the tube 1 by welding 4.

The ends of the tube are received in end plates 5, C-shaped in side elevation. These plates are also welded to the tube as shown at 6. Cover plates 7 are slidable in the grooves of the C-plates 5 as clearly shown in Figure 2, and bolts 8 secure the cover plates 7 in position, and these bolts extend down through openings in four of the plates 2 disposed adjacent to the C-plates. Spacing sleeves 9 are mounted on the bolts 8 and are disposed between adjacent plates 2. This structure provides a stronger mounting and acts as reinforcing for the tubular member 1.

The end covers 7 have slots 10 therein for removably receiving shafts 11. A bearing 12 is removably secured to each end cover 7, and this bearing rotatably carries the shaft 11. Figure 1 shows two shafts 11 as being carried by bearings 12, and the inner ends of the shafts are journalled in removable bearings 13, these in turn being carried by a partition 14 that extends transversely across the tubular member 1. Members 15 (see Figure 1) may be removed from the tube 1 and provide hand holes for permitting access to the inner parts.

Each shaft 11 carries a rotor 16 of an electric motor, and the inner wall of the tube carries field coils 17, one set of field coils being provided for each rotor. The commutators 18 of the rotors are disposed adjacent to the inner ends of the shafts 11, and brushes 19 bear against the commutators in the usual manner.

I have shown wheels 20 operatively connected to the shafts 11, and these wheels may be truck or train wheels, and they may carry solid or balloon tires. In Figure 3 I show how the wheels 20 are connected to the shafts 11 so that a gear reduction exists between the wheels and the shafts. The shaft 11 carries a pinion 21, and this meshes with idlers 22. The idlers are mounted upon shafts 23 which in turn are carried by a disc 24 (see Figure 1), and this disc forms a part of the hub 25 that houses the bearing 12. The wheel 20 has an internal gear 26 that meshes with the idlers 22. It will be seen that a rotation of the shaft 11 will cause the gear 21 and idlers 22 to rotate the gear 26, which in turn will rotate the wheel 20. In this way a gear reduction is established between the wheel and the shaft. Both shafts 11 are carried to their respective gears in the manner just described.

Figures 2 and 4 show how the end plates 5 extend beyond the intermediate reinforcing plates 2. The end plates support springs 27, and I have shown two springs disposed on each side of the tubular member 1. A body frame 28 is carried by the springs 27. The slot 10 is covered by a plate 29 after the device has been assembled, and this prevents dirt from gaining access to the interior of the tube.

From the foregoing description of the various parts of the device, the operation thereof may be readily understood.

The wheels 20 at one side of the tube have an independent drive from the wheels at the other end of the tube. The motors may be of the interpole type, and will create the same driving force on both sets of wheels, and in case of making turns one motor can be kept running while the other idles, if desired, this means not being shown as it forms no part of the present invention. It is obvious that the shafts 11 can be directly connected to the wheels and thus do away with the gear reduction shown in Figure 3. The plates 2 not only act as reinforcing members for the tube 1, but they also act as radiating fins for dissipating heat.

If it is desired to gain access to the rotors 16 so as to remove them from the tube 1, the wheels 20 can first be removed and then a bar (not shown) be slipped through aligned openings 29' in the tube 1 for supporting the outer end of the shaft 11. The hub 25 can now be removed, and this carries the bearing 12 therewith. The rod in the openings 29' prevents the shaft 11 from dropping down. The end cover 7 can be removed from the C-plate 5, and access is now had to the rotor. I have already described how access can be had to the commutator through the hand holes when the members 15 are removed.

Having described my invention, what I claim and desire to secure by Letters Patent is:

1. An electric machine comprising a tubular frame, transverse reinforcing members having openings for receiving the tube and being welded to the tube, and plates secured to the ends of the tube, a partition disposed midway in the tube, a motor shaft disposed on each side of the partition and being rotatably carried thereby, the outer ends of the motor shafts being rotatably carried by the end plates, motors mounted in said tube, and wheels operatively connected to the outer ends of the motor shafts.

2. In an electric machine, a tubular member, an end plate mounted on the end of the tubular member and being welded thereto, said end plate being C-shaped in side elevation, an end cover slidably received in the end plate and having a slot for receiving a motor shaft, a motor mounted in said tube and having its shaft extending through the slot, a bearing removably secured to the cover and supporting said shaft, and a wheel operatively secured to the outer end of the shaft.

3. In an electric machine, a tubular member, an end plate mounted on the end of the tubular member and being welded thereto, said end plate being C-shaped in side elevation, an end cover slidably received in the end plate and having a slot for receiving a motor shaft, a motor mounted in said tube and having its shaft extending through the slot, a bearing removably secured to the cover and supporting said shaft, a wheel operatively secured to the outer end of the shaft, transverse plates having openings large enough to receive the tube and being welded to the tube, and bolts for securing the cover to the end plate, said bolts projecting through the reinforcing plates.

4. In an electric machine comprising a tubular frame, a plurality of plates extending transversely and being welded to said frame, C-shaped plates channeled in cross section disposed at the end of the frame, the channel-shaped plates and certain of the first-named plates having bolt openings, bolts passed through the aligned openings, slides carried by the channel-shaped plates and being secured in place by said bolts, a partition dividing the interior of the tubular frame into two motor receiving compartments and being welded to the frame, a bearing disposed on each side of said partition, an armature shaft for each bearing, said slides having slots for receiving the outer ends of said shafts, and motor field poles disposed within the tube and surrounding the armatures.

In testimony whereof, I affix my signature.

REED E. JACOBS.